United States Patent
Beecroft et al.

(10) Patent No.: US 9,843,525 B2
(45) Date of Patent: Dec. 12, 2017

(54) APPARATUS AND METHOD

(75) Inventors: Jon Beecroft, Bristol (GB); David Charles Hewson, Bristol (GB)

(73) Assignee: Cray UK Limited, Reading (GB)

(*) Notice: Subject to any disclaimer, the term of this patent is extended or adjusted under 35 U.S.C. 154(b) by 289 days.

(21) Appl. No.: 13/704,196

(22) PCT Filed: Jul. 7, 2011

(86) PCT No.: PCT/GB2011/051272
§ 371 (c)(1),
(2), (4) Date: Feb. 2, 2013

(87) PCT Pub. No.: WO2012/004600
PCT Pub. Date: Jan. 12, 2012

(65) Prior Publication Data
US 2013/0215750 A1   Aug. 22, 2013

(30) Foreign Application Priority Data
Jul. 7, 2010 (GB) .................................. 1011442.9

(51) Int. Cl.
H04L 12/823   (2013.01)
H04L 12/801   (2013.01)

(52) U.S. Cl.
CPC .......... H04L 47/32 (2013.01); H04L 47/11 (2013.01); H04L 47/12 (2013.01); H04L 47/193 (2013.01)

(58) Field of Classification Search
USPC ....................................................... 370/235
See application file for complete search history.

(56) References Cited

U.S. PATENT DOCUMENTS

| | | | |
|---|---|---|---|
| 6,490,251 B2* | 12/2002 | Yin | H04L 47/10 370/236.1 |
| 6,950,393 B1 | 9/2005 | Ben Nun et al. | |
| 6,996,062 B1 | 2/2006 | Freed et al. | |
| 7,206,282 B1 | 4/2007 | Goldman et al. | |
| 7,376,125 B1* | 5/2008 | Hussain et al. | 370/352 |

(Continued)

OTHER PUBLICATIONS

Rajanna V.S. et al.: "XCo: Explicit Coordination for Preventing Congestion in Data Center Ethernet", Storage Network Architecture and Parallel I/OS (SNAPI), 2010 International Workshop On, IEEE, Piscataway, NJ, USA, May 3, 2010, pp. 81-89.

(Continued)

*Primary Examiner* — Shaq Taha
*Assistant Examiner* — Manuel Rangel
(74) *Attorney, Agent, or Firm* — Craig J. Lervick; Larkin Hoffman Daly & Lindgren, Ltd.

(57) ABSTRACT

A method of controlling data packet congestion in a data packet network comprises determining a reference flow condition that results in data packet congestion at a node of a data packet network, and identifying a data packet flow having a flow condition substantially equal to the reference flow condition. For such an identified data packet flow the following actions are taken causing a data packet to be dropped from the identified data packet flow, allowing a predetermined number of data packets from the identified data packet flow to proceed, and dropping data packets from the identified data packet flow subsequent to the predetermined number of data packets, until the packets that were not dropped have been delivered to the egress ports of the network.

25 Claims, 6 Drawing Sheets

(56) References Cited

U.S. PATENT DOCUMENTS

| | | | |
|---|---|---|---|
| 7,570,652 B1 | 8/2009 | Distler et al. | |
| 7,613,116 B1 | 11/2009 | Medina | |
| 2003/0058793 A1 | 3/2003 | Rochon et al. | |
| 2005/0226154 A1* | 10/2005 | Julka et al. | 370/235 |
| 2007/0133419 A1* | 6/2007 | Segel | H04L 47/10 370/236 |
| 2007/0237074 A1* | 10/2007 | Curry | 370/229 |
| 2008/0005156 A1* | 1/2008 | Edwards et al. | 707/102 |
| 2008/0008092 A1* | 1/2008 | Wang et al. | 370/235 |
| 2008/0186918 A1* | 8/2008 | Tinnakornsrisuphap et al. | 370/331 |
| 2008/0225715 A1* | 9/2008 | Plamondon | 370/232 |
| 2008/0225721 A1* | 9/2008 | Plamondon | 370/235 |
| 2008/0259936 A1* | 10/2008 | Hussain et al. | 370/397 |
| 2009/0046593 A1* | 2/2009 | Ptasinski et al. | 370/252 |
| 2009/0274046 A1* | 11/2009 | Singh et al. | 370/235 |
| 2010/0020685 A1* | 1/2010 | Short et al. | 370/230 |
| 2010/0020687 A1 | 1/2010 | Spatscheck et al. | |
| 2010/0020689 A1* | 1/2010 | Tang | 370/235 |
| 2010/0027425 A1* | 2/2010 | Cheung et al. | 370/238 |
| 2010/0039938 A1* | 2/2010 | Sagfors | H04L 41/0896 370/238 |
| 2010/0046370 A1* | 2/2010 | Ghose | H04L 1/1809 370/235 |
| 2010/0103819 A1* | 4/2010 | Samuels | H04L 12/24 370/235 |
| 2010/0157797 A1* | 6/2010 | Dinescu | 370/230.1 |
| 2010/0177637 A1* | 7/2010 | Kadambi | H04L 12/4641 370/235 |
| 2010/0195494 A1* | 8/2010 | Sun et al. | 370/230 |
| 2010/0220588 A1* | 9/2010 | Plamondon | 370/230 |
| 2010/0220732 A1* | 9/2010 | Hussain et al. | 370/395.53 |
| 2010/0220742 A1* | 9/2010 | Brewer et al. | 370/412 |
| 2010/0226247 A1* | 9/2010 | Plamondon | 370/229 |
| 2010/0226250 A1* | 9/2010 | Plamondon | H04L 47/10 370/230 |
| 2010/0309783 A1* | 12/2010 | Howe | 370/230 |
| 2011/0064084 A1* | 3/2011 | Tatar et al. | 370/392 |
| 2011/0242979 A1* | 10/2011 | Feroz et al. | 370/235 |
| 2011/0267942 A1* | 11/2011 | Aybay et al. | 370/230 |
| 2014/0192639 A1* | 7/2014 | Smirnov | H04L 47/10 370/230 |

OTHER PUBLICATIONS

Alexander Shpiner et al.: "A switch-based approach to throughput collapse and starvation in data centers", Quality of Service (IWQOS), 2010 18th International Workshop On, IEEE, Piscataway, NJ, USA, Jun. 16, 2010, pp. 1-9.

Santosh Kulkarni et al.: "A Probabilistic Approach to Address TCP Incast in Data Center Networks", Distributed Computing Systems Workshops (ICDCSW), 2011 31st International Conference On, IEEE, Jun. 20, 2011, pp. 26-33.

Prajjwal Devkota et al: "Performance of Quantized Congestion Notification in TCP Incast Scenarios of Data Centers, Modeling, Analysis & Stimulation of Computer and Telecommunication Systems (Mascots)", 2010 IEEE International Symposium On, IEEE, Piscataway, JJ, USA, Aug. 17, 2010, pp. 235-243.

* cited by examiner

TCPHash Cache Entry.

| 16 bit TCPHash value | 6 bit FC # | 8 bit Outstanding Flow | 5 bit State |
|---|---|---|---|

APPARATUS AND METHOD

The present invention generally relates to an Ethernet network and to a method of data delivery across a network. In particular, the present invention is concerned with the distribution and efficient delivery of data across a network conforming to current or future Ethernet standards.

Protocol Layers

Conceptually, an Ethernet network is decomposed into a number of virtual layers in order to separate functionality. The most common and formally standardised model used is the Open Systems Interconnect (OSI) reference model. A useful article which described in detail the OSI reference model is "OSI Reference Model—The ISO Model of Architecture for Open Systems Interconnection" by Hubert Zimmermann, IEEE Transactions on Communications, Vol. COM-28, No. 4, April 1980. The OSI reference model comprises seven layers of network system functionality, as follows:

1. Physical Layer is responsible for physical channel access. It consists of those elements involved in transmission and reception of signals, typically line drivers and receivers, signal encoders/decoders and clocks.
2. Data Link Layer provides services allowing direct communication between end-station devices over the underlying physical medium. This layer provides Framing, separating the device messages into discrete transmissions or frames for the physical layer, encapsulating the higher layer data packet protocols. It provides Addressing to identify source and destination devices. It provides Error Detection to ensure that corrupted data is not propagated to higher layers.
3. Network Layer is responsible for network-wide communication, routing framed packets over the network between end-stations. The network layer must accommodate multiple Data Link technologies and topologies using a variety of protocols, the most common being the Internet Protocol (IP). The network layer is generally considered to be unreliable but will make a "best effort" to deliver data packets correctly from their source to their destination.
4. Transport Layer is responsible for end-to-end communication, shielding the upper layers from issues caused during transmission, such as dropped data, errors and mis-ordering caused by the underlying medium. This layer provides the application with an error-free, sequenced, guaranteed delivery message service, managing the process to process data delivery between end stations. Transmission Control Protocol (TCP) and User Datagram Protocol (UDP) are the most commonly recognised Transport Layer protocols.
5. Session Layer is responsible for establishing communications sessions between applications, dealing with authentication and access control.
6. Presentation Layer ensures that different data representations used by machines are resolved.
7. Application Layer provides generic functions that allow user applications to communicate over the network.

Communication networks suffer from congestion. Such congestion occurs when a network switching element receives packet data from one or more ingress ports and then routes that received data to an egress port which is unable to transmit the data at the rate it is arriving from all the ingress ports. In a multi stage network there are two areas where congestion can arise, namely congestion occurring within the network and congestion occurring at the network egress edge.

Congestion can be generated within the network when poor or statically configured routes direct unrelated packet streams onto the same internal network link.

At the network egress edge, congestion can occur when the client, or server, connected to the network is unable to take the data being delivered at the full link rate at which it is arriving. Congestion at the network egress edge occurs more commonly, however, when more than one client is trying to send data, at full line rate, to a single egress port operating at the same line rate, this will be referred to herein as "end point congestion".

Within network data transmission, a multicast operation occurs when one source generates data that is sent to many destinations. Incast is the inverse function to multicast and when an incast operation occurs many sources send data to a single destination. Incast operations can generate end point congestion. There are other sources of end point congestion that can occur alongside a TCP communication where other traffic that may not be TCP based interferers with a TCP communication. The Ethernet adapter on a receiving node may not be able to cope with the rate of packets being sent to the node and may have to limit the data rate by sending IEEE 802.3 pause frames. The receiver could be taking other unrelated packets that perhaps may be UDP based or another protocol.

Incast generated end point congestion, herein referred to as incast generated congestion, is a recognised problem that occurs, for example, in data centres or other large computing platforms where many clients and servers communicate. An example of an incast generated congestion event arising would be when, in an effort to improve performance, a client application issues a set of striped file read requests to many separate severs that each hold a portion of a large data file. The separate severs can all operate in parallel and have the potential to return the whole data file in a fraction of the time a single server could recover the data. Often the servers are already busy performing data operations for other clients and may take a variable amount of time to return the data. In this case the client will receive each of the separate parts at separate times and reassemble them into a single data file. However, sometimes the servers will not be busy with other operations and could all respond in more or less the same amount of time. When this happens an incast event can occur as all the servers will return their part of the data at the same time and at full line rate. The network link connected to the receiving client is only able to receive data at the full line rate. Therefore, the network link becomes swamped as each of the data parts arrives at the same full line rate. As will be appreciated, the problem caused by incast generated congestion can be especially severe in situations involving large parallel data bases or large parallel file systems.

Many applications use TCP as the underlying transport layer to communicate. There are many different implementations of TCP however each share the basic principle of providing reliable ordered stream of bytes from a first application running on one computer which has one operating system to an application, which may or may not be a different application from the first application, running on a different computer which may or may not be using a different operating system from the other computer. TCP manages the size of the IP data packets to be transmitted across the network and also manages the flow of data between two communicating applications by keeping track of the packets being transmitted. TCP will, if necessary, reorder packets that have arrived in the wrong order and will also manage the process of retry of lost packets, which means if a packet does not appear to have been received, a re-transmission of the "lost" packet will take place to try and guarantee the reliable delivery of all the data. TCP also tries to deliver the best network performance possible by measuring the apparent end to end bandwidth available across the network between the two communicating applications, and then matching this apparent bandwidth when issuing IP packets into the network. TCP tries to deliver the highest possible bandwidth without swamping the network and causing unnecessary congestion for other packet streams. There are a number of scenarios, including incast generated congestion and all other forms of end point congestion, where this does not work but in general it does deliver good performance.

TCP is a full duplex protocol meaning data packets can be sent in either direction between the two end points of a TCP connection. Acknowledgments for reception of packets transmitted in one direction are piggybacked onto data packets being transmitted in the other direction. All TCP packets and IP packets sent into a network should normally be acknowledged, although it is often the case that one acknowledgment can be used to signal the successful receipt of many TCP/IP packets. The time it takes for an acknowledgment to be returned is commonly called the round trip time (RTT). The RTT can vary depending on several different factors including, but not limited to, the size of the network, the congestion within the network, the available bandwidth between the two endpoints between which the transmission of data is taking place and the way the TCP receiver is configured. For example, it will be appreciated that a packet sent from a client browser on one side of the world to a web server on the other side of the world would have a huge RTT compared with a client and server operating in the same machine room or data centre. Similarly, the RTT will be significantly increased if packets are being buffered in the network due to network congestion.

FIG. 1 is a typical example of a simple client server configuration connected to a network with a client 2 connected by an Ethernet link 3 to a network 4. In turn, an Ethernet link 5 connects the server 6 to the network 4. In this example Ethernet links 3, 5 are the physical layer connecting the computers 2, 6 to the network. FIG. 2 illustrates the flow of data packets in a TCP one way communication between the client 2 and the server 6. It shows a normal uncongested TCP flow of data from a sending TCP port to a receiving TCP port. In FIG. 2, each data packet is shown to take a discreet time T to cross the network. TCP acknowledgements, acknowledging the packets having been received, are being returned across the network frequently. In this example, the data transmission process is progressing well. The RTT from a packet being sent from the first end point to the corresponding acknowledgement being received by the same first end point, in this example, is a small time interval of a few microseconds for a high performance system but perhaps more typically a few tens of microseconds in a data centre environment.

A TCP receiver uses a receive window to manage the IP packets received from the network. The receive TCP process has some buffer space used to reassemble packets at the receiver and manage the flow of packets from the transmitter. The TCP receive window represents the number of bytes that the receiver is probably willing to receive and so is the upper limit on the amount of unacknowledged data that should be sent. Note that it is a hint and is not necessarily a hard limit. It can vary over time as it is included in all TCP headers that are sent. It will often be advertised as 0 to prevent more data from being transmitted in the case where the host's buffers fill up. Like other buffers in the network the host's receive buffers could become full and cause some of the packets received to be dropped. The window size advertised to the transmitter reduces the probability of a window overflow. A TCP transmitter is allowed to send a configurable amount of data into the network before an acknowledgment is received. If more than one transmitter is transmitting data to the TCP receiver, each of the transmitters will transmit on the basis of the window size advertised to it by the TCP receiver. TCP is a point to point communication protocol. If there are multiple transmitters to a single receiver then each transmitter will have a separate receive window at the receiver but they may share a common set of buffers. However they all have to share the same Ethernet connection to the receiver. This Ethernet connection cannot take the data from many transmitters at the same time without data being buffered in the network. Each transmitter is able to inject data into the network at the full bandwidth of its connection but data is being drained from the network at the bandwidth of only one receiving connection. The buffers in the network must absorb the excess data. FIG. 3 shows a network system in which such an issue could arise. With reference to FIG. 3 there can be seen a network system 10 comprising a client 20 connected by Ethernet link 22 to Ethernet network 24 which in turn is connected via Ethernet links 26a, 26b and 26c to servers 28a, 28b and 28c respectively. Each Ethernet link 22, 26a, 26b and 26c has the same full line rate capability. In this case, client 20, is running a client application (not shown) which issues a file read request to the server applications (not shown) running on servers 28a, 28b and 28c which each hold a portion of the large data file to which the file read request relates. In this case, servers 28a, 28b and 28c are not busy with other operations and all respond, returning their part of the data at the same time and at full line rate, in more or less the same amount of time thus causing incast generated congestion to occur. An example of network operation such as this, which could cause incast generated congestion, is shown in FIG. 4.

As can be seen in FIG. 4, the three separate TCP flows 36a, 36b and 36c are setup to correspond to the three separate links 26a, 26b and 26c to the network 24. Each of the TCP flows 36a, 36b and 36c attempts to transmit data 40a, 40b and 40c to a single network destination connection 32 associated with link 22. In this example, each of the servers 28a, 28b and 28c is transmitting data packets 40a, 40b and 40c at full line rate. The destination connection is not able to handle the influx of data at once and as can be seen a backlog of transmitted data packets starts to occur at the receiving port. As can be seen from FIG. 4, the transmission latency for each successive packet to cross the network increases by the time it takes to send 2 packets on a network link. In this example for every three packets put into the network only one packet is able to drain from the network. Effectively two packets must wait in network buffers until the draining link is able to send them to the receiver. The longer that more packets are being put into the network by the transmitters than are being drained from the network by the receiver, the fuller the network buffers will become. Eventually the transmitters will be required to stop sending packets until the receiver is able to reply with acknowledgments. When this happens all the network buffers that have been loaded with packets are able to drain onto the link connected to the receiver because they are no longer being filled by the transmitters. If the TCP window size has been set to a large value then the transmitters may be able to inject more data into the network than the network buffers are able to hold. This depends on the relative size of the buffers within the network against the TCP window size.

When this condition occurs the network buffers will overflow and packets will be lost, causing the transmitters to resend their data, increasing data latency. While more packets are being injected into the network than are being drained from the network the RTT for data issued by each transmitter increases with each new data packet transmitted. Without intervention, if the end point congestion problem created by the incast event persists for long enough, buffers (not shown) within the network 24 holding the undelivered data packets will eventually overflow causing the loss of some of the data packets that may, in turn, result in a TCP timeout and subsequent resend.

It will be clearly understood that whilst this example only illustrates a situation where three transmitters are transmitting simultaneously to a single port, the problem can rapidly become severe if tens or hundreds of transmitters are involved thus causing extremely high RTT values. For example if 100 transmitters are sending to one receiver then the transmit latencies will be on average 100 times larger than normal because each transmitted packet will have to share the receivers link with 99 other transmitters. RTT= (forward latency+return latency). If we assume the return latency is the same as the uncongested transmit latency then the RTT will be 100+1 compared with the normal 1+1. This is 50.5 times greater than normal.

Many networks have no flow control on the links connecting the switching elements. They rely on congestion being temporary and the internal buffers being big enough to cope when the temporary congestion is occurring. However, eventually, if the congestion lasts for long enough, the buffers can overflow and data will be lost. Different strategies have been developed for dropping or deleting the packets that cannot be accommodated in the buffers. The simplest mechanism is to drop the packet which, upon arriving, causes the buffer to overflow. However, whilst this mechanism is simple to implement, this does not always give the best behaviour for TCP or other applications. An alternative mechanism for creating more space and alleviating overflow involves dropping the packet which was to be taken next from the buffer. Currently, however, one of the most successful mechanisms for creating space is considered a random drop of a data packet; this involves a randomly selected packet being dropped from the buffer to create space when the buffer is getting perilously close to being full.

TCP/IP is a reliable protocol that can always recover from an occasional loss of packets between the sender and receiver. This loss is detected using the sequence number that appears as part of the TCP header at the start of all TCP packets. Each time the transmitter sends a packet into the network the sequence number in the TCP header is updated to identify the position of the data payload within the byte steam. The transmitter will send the data in order except if it determines that it may need to retransmit a portion of the data stream. The receiver normally expects to receive the data in the correct order. Occasionally a packet may be lost due to network buffers overflowing or perhaps due to a network error. In this case the received sequence numbers would show a missing packet or packets. On other occasions a network may reorder a packet sequence. This can occur if some packets are delivered across the network using a different route. Networks are normally expected to try to deliver packets to a destination in the same order they enter the network if they enter from the same source however, this is not always possible to guarantee. If packets are reordered then it is probable that the out-of-sequence packet would arrive very soon after its natural ordered position. The receiver acknowledges the packets it receives. If packets are being received in the correct order then not every packet that is received needs to be acknowledged and a single acknowledgment may signal the reception of many packets. This is done by acknowledging the last packet's sequence number and this implies the successful reception of all the packets before the last packet. If a packet arrives out of sequence then the receiving TCP process is required to send an acknowledgment for the last packet that was in the correct sequence even if it has already sent an acknowledgment for that packet. Every subsequent packet received while a packet is missing from the correct sequence would also cause a duplicate acknowledgment for the last correctly sequenced packet. If the missing packet arrives then an acknowledgment for the new final correctly sequenced packet should be sent by the receiver. When the transmitter receives one or more duplicate acknowledgments and it has already sent more packets it can assume a packet has been lost in the network either because of an error or because the packet has been dropped from a buffer in one of the switching elements. It can then decide to resend the packet after the acknowledged packet. The resending of missing packet can be done quickly in direct response to the duplicate acknowledgment preventing a significant loss of bandwidth. In practice the receiver would have to receive two or three extra packets after the missing packets before the transmitter is likely to resend the missing packet.

An alternative mechanism the TCP can use to recover from an occasional loss of packets between the sender and receiver is a Timeout mechanism. This will occur when a transmitter is expecting to receive an acknowledgement for a packet or packets it has already sent and the acknowledgment does not arrive. The receiver is not required to acknowledge receipt of every individual packet but it should reply within a reasonable period of time known as the timeout. If the acknowledgment does not appear at the transmitting end then either some packet or packets were lost while being transmitted to the receiver or the acknowledgment was lost on the return journey, the transmitter must assume the data was lost and must resend the data on the timeout period expiring. The duration of the timeout cannot be set to too small a value as the data and acknowledgment may just be delayed by network congestion. The TCP timeout is often calculated using Jacobson's algorithm which operates on a Smoothed Round Trip Time (SRTT) and an estimate of the deviation between RTT values, this is calculated from the individual RTT samples. It is usually:

$$\text{Timeout} = u * \text{SRTT} + q * \text{Deviation}$$

Where u=1 and q=4

This works well for larger values of RTT where perhaps the TCP communication is occurring over the internet and the RTT is tens or hundreds of milliseconds. However operating systems often impose a lower limit on timer driven interrupts and the minimum value are probably 5 or 10 ms. Congestion in a network can appear quickly and just as quickly disappear again. The sampled RTT could have been made when there was little network congestion or when there was severe congestion. The effect of a timeout on bandwidth is severe and is even worst for high bandwidth links. For example if a data centre uses a timeout value of 10 ms for local TCP connections and the links are operating using 40 Gbps Ethernet links then 50 Mbytes of data transmission is lost during the timeout. Even a very small rate of timeouts can produce a dramatic loss of bandwidth.

Therefore there is a need for a mechanism and associated method of actively deleting data packets causing incast generated end point congestion within the network and enabling a controlled TCP retry whilst, where possible, minimising network congestion and TCP timeout. An object of the present invention is to obviate or mitigate at least one of the aforementioned problems.

According to one aspect of the present invention, there is provided a method of controlling data packet congestion in a data packet network, the method comprising the steps of determining a reference flow condition that results in data packet congestion at a node of a data packet network, identifying a data packet flow having a flow condition substantially equal to the reference flow condition, and, for such an identified data packet flow causing a data packet to be dropped from the identified data packet flow, allowing a predetermined number of data packets from the identified data packet flow to proceed, and dropping data packets from the identified data packet flow subsequent to the predetermined number of data packets, until the packets that were not dropped have been delivered to the egress ports of the network.

According to another aspect of the present invention, there is provided a data packet flow controller for controlling data packet congestion in a data packet network, the controller comprising a reference unit operable to determine a reference flow condition that results in data packet congestion at a node of a data packet network, a detector operable to identify a data packet flow having a flow condition substantially equal to the reference flow condition, and a control unit operable, for such an identified data packet flow, to cause a data packet to be dropped from the identified data packet flow, allow a predetermined number of data packets from the identified data packet flow to proceed, and drop data packets from the identified data packet flow subsequent to the predetermined number of data packets, until the packets that were not dropped have been delivered to the egress ports of the network.

Such a technique enables congestion to be avoided, by causing a network to use controlled packet resend.

The reference flow condition can relate to destination information of a data packet flow, and the flow condition can then relate to destination information of the identified data packet flow. Identifying destination information of a data packet flow can enable faster detection of potential congestion in the network.

Identifying a data packet flow may also include identifying source and destination information for the data packet flow concerned, since source data may also provide useful indications of potential congestion.

Identification of a data packet flow may be performed upon entry of the data packet flow concerned into the Ethernet network, or may be performed while a data packet flow is waiting at a network switch of the Ethernet network.

Such a technique is particularly useful in identifying incast data packet flows. Such a method may further comprises determining a data quantity threshold value for the network, and identifying a data packet flow that causes that threshold value to be exceeded, such that the data packet flow becomes the identified data packet flow. Using a data quantity threshold enables overall network congestion to be taken into account when controlling incoming data packet flows.

According to an example, a data packet network in a method of controlling data packet congestion in a data packet network delivers Ethernet packets. Furthermore, the data packets can be part of a TCP/IP stream.

According to an example, a data packet network utilizing a controller for controlling data packet congestion in the data packet network delivers Ethernet packets. Furthermore, the data packets can be part of a TCP/IP stream. An identified data packet flow can be an incast flow.

Such a method may also include allocating a priority value to an incoming data packet flow, and using that priority value when identifying the data packet flow. In this way, higher priority data packet flows can be retained in preference to lower priority data packet flows.

These and other aspects of the present invention will be more clearly understood from the following description and, by way of example only, and with reference to the following figures, in which.

Figure 1:
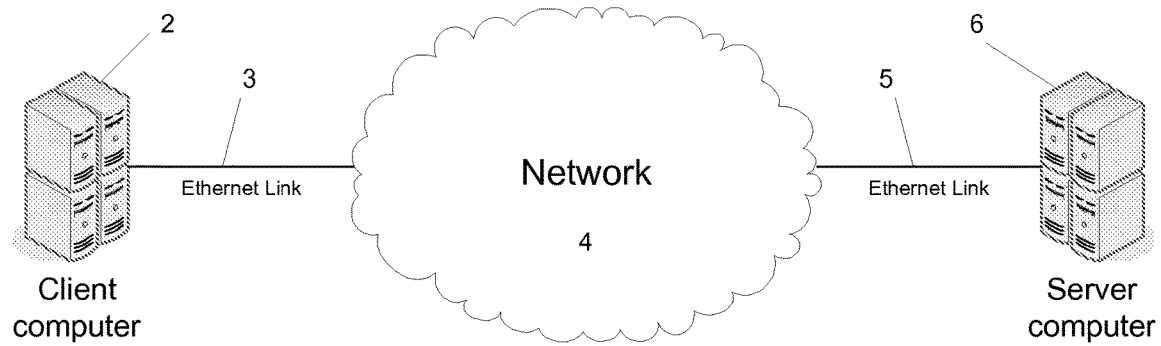
FIG. 1 is a client server network system having a single server.
Figure 2:
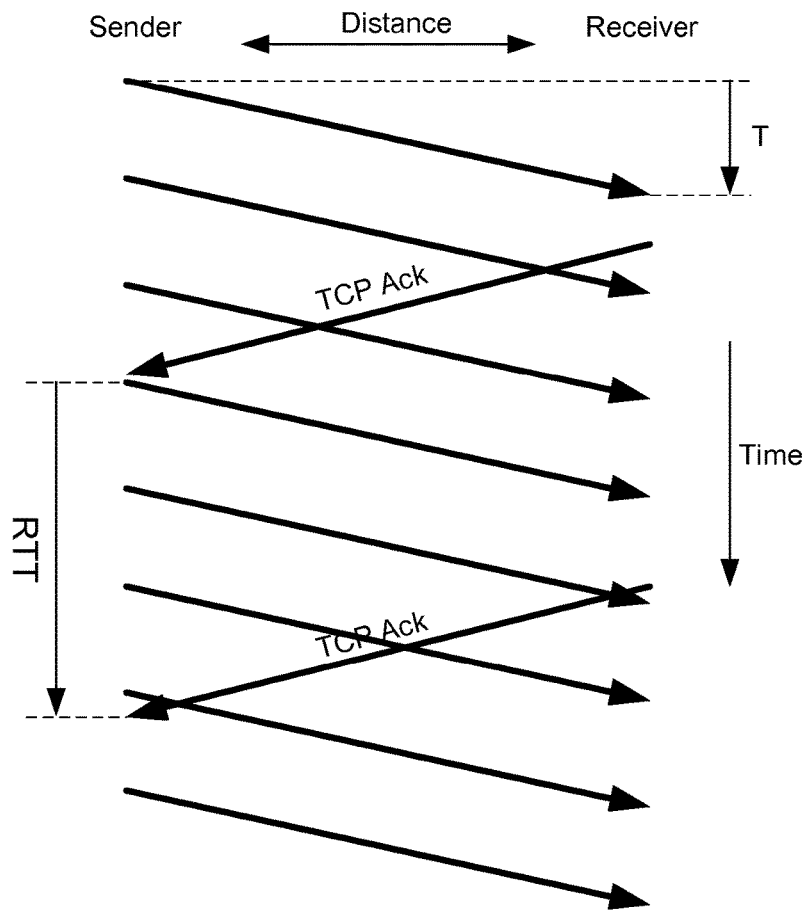
FIG. 2 is a diagrammatic representation of TCP data flow within the network system of FIG. 1.
Figure 3:
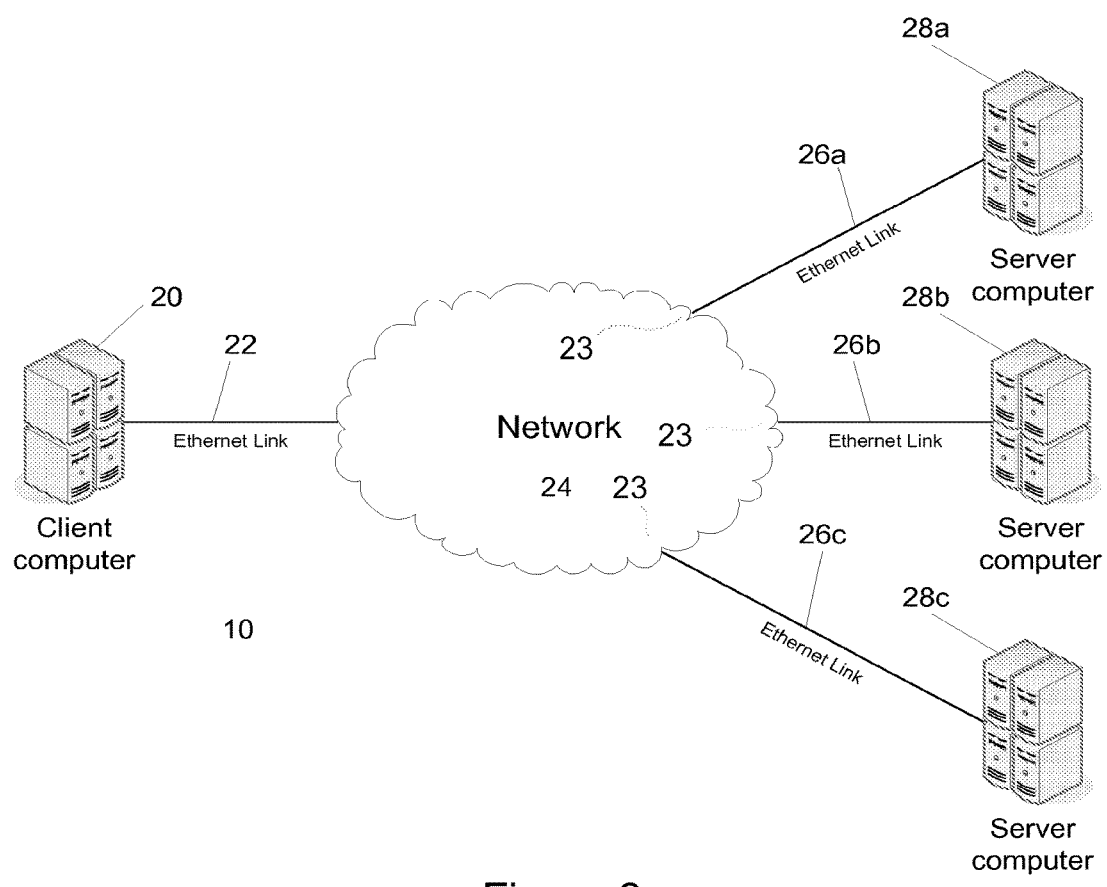
FIG. 3 is a client server network system having multiple servers.
Figure 4:
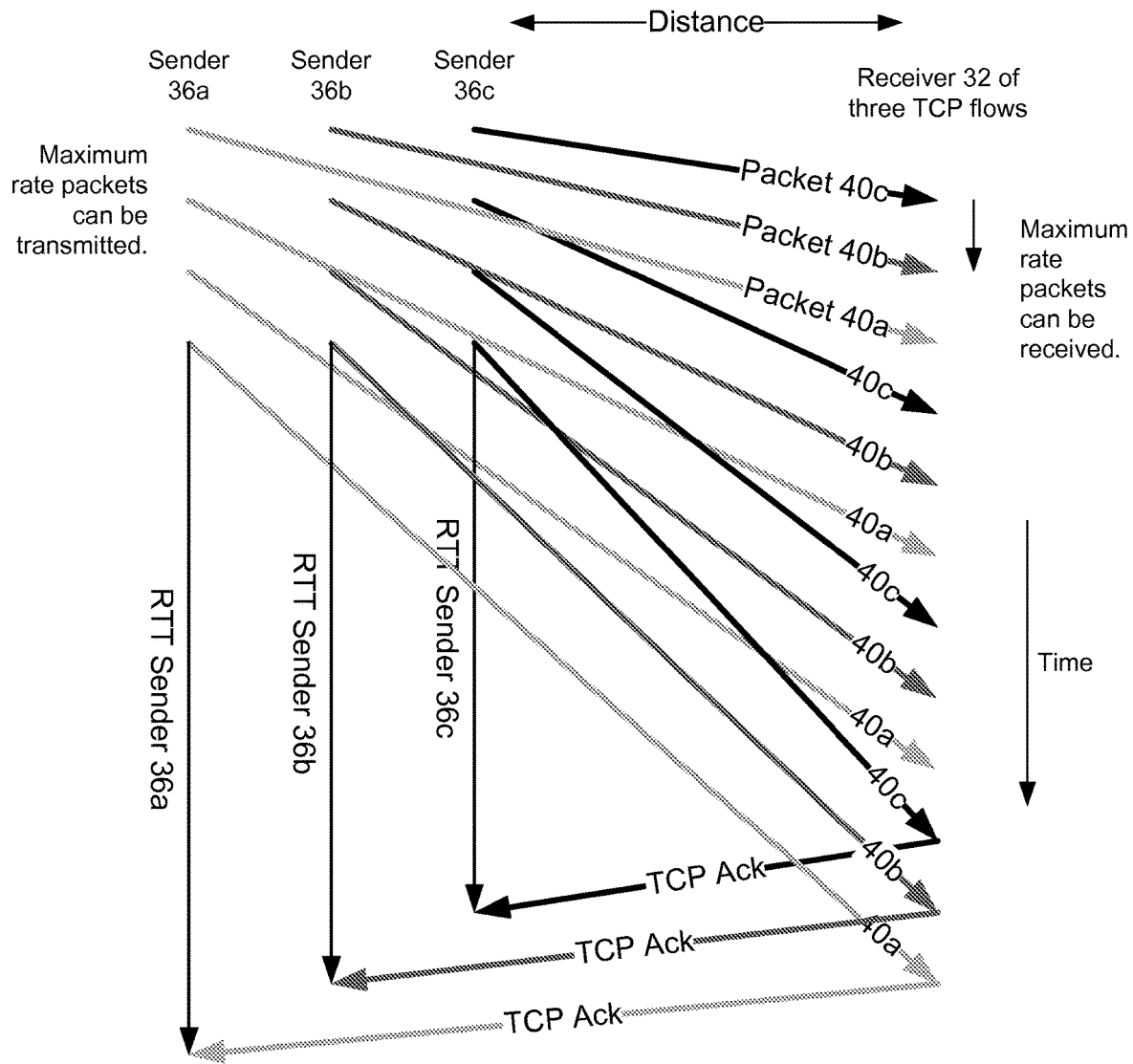
FIG. 4 is a diagrammatic representation of TCP data flow within the network system of FIG. 3.

Within the TCP layer of Ethernet network 24 of a network system 10 as shown with reference to FIGS. 3 and 4, there is implemented an active drop mechanism to action the active drop of selected data packets when network end point congestion, associated with an incast event, occurs.

There are many ways that end point congestion caused by an incast operation might be detected. In this example, logic uses knowledge of what data packets are being routed to the final egress port 23 of the network 24. For Ethernet network 24, the Media Access Control (MAC) addresses of the data packets arriving at the network are translated into compressed values which indicate the egress port to which they are to be routed. For example, each 48 bit MAC address is translated to a 16 bit network route value wherein the network route value for all MAC addresses that need to be routed to a particular egress port is the same. Logic within the network compares the network route value of data packets within the network as it is smaller and more convenient to compare within the network than an uncompressed MAC address which is 48 bits wide. As the network route value is used to direct all packets to a particular network egress port, an influx of data packets having the same network route value can create conditions which may cause endpoint congestion to arise. The logic comparison can be made while data packets are waiting to connect to an output as they cross individual switching elements within the network. The active drop mechanism will utilise the logic comparison results and detect an influx of data packets having the same network route value which may cause endpoint congestion to arise and will act as a first indicator of an incast event occurring. The network route is used to direct packets to the correct egress port. The network route is used to detect end point congestion by observing that other packets using the same internal network links from different ingress ports have the same network route as the current packet. The network route is generated using the destination MAC address in the Ethernet header received on the ingress port. The TCPHash value is calculated if the current frame includes a TCP encapsulation using the IP source and destination addresses and port numbers in the TCP header. The TCP frame is encapsulated in an IP frame that is in turn encapsulated in an Ethernet frame.

TCP flows are identified with a source and destination IP address and a source and destination 16 bit port address. Currently there are two active IP standards, IPv4 and IPv6. IPv4 uses a 32 bit IP address value and IPv6 uses a 128 bit address value. For convenience, these large address values may be each compressed using, for example, a cyclic redundancy check (CRC) into a corresponding small hash value that is easier to store and manage. It is to be noted, however, that such compression is not a requirement of embodiments of the present invention. In a first embodiment of the invention, a 128 bit address value is compressed using a CRC into a corresponding 16 bit hash value called the TCPHash. The TCPHash allows many different flows to be identified without needing too much logic to store and compare values. This is an optimisation that may significantly reduce the total logic required to create an implementation. Packet parsing logic is required to identify TCP data packets and extract the IP and port fields This occurs when the frame is received from the external Ethernet network and is about to be injected into the internal network. This will generate a TCP valid flag as well as the TCP Hash.

The best place to act upon a data flow causing an incast problem is where the incasting data packets enter the network. However the endpoint congestion is usually detected within the network and the detection is probably close to the egress port. Networks that manage data flows can use additional acknowledgments that can be proprietary. These acknowledgements can carry more information than just the progression of the data flow. They can be used to indicate that end point congestion has been detected further into the network for this particular data flow and this can be passed all the way back to the ingress port of the network and used to influence the decision about dealing with an incast event.

The network has a mechanism called Flow Channels (FC) that follow the flow of all TCP data packet streams through the network from source to destination and so is able to measure the total amount of data for any given data flow that is currently buffered within the network. An individual FC is associated with a data stream when that data stream is an Ethernet source and destination MAC address pair. They may not necessarily have the same IP addresses or IP port numbers. End point congestion causes the total internally buffered data to increase rapidly. If a pre-determined threshold of the amount of data buffered within the network is exceeded this will be detected by the FC, the active drop mechanism will be notified and a second indicator of an incast event occurring is generated.

At this stage, when end point congestion has been detected and significant data is buffered in the network, the first buffer into the network, which in this case is the buffer closest to the ingress port to which the influx of data is being sent, may not yet have reached a limit where there is a danger of dropping data packets. Should the congestion pass quickly, the dropping of data packets may not occur. Therefore, the first network buffer is provided with a threshold limit to indicate it is nearing overflow and that data packets may be lost. This threshold limit will help to prevent unnecessary activation of the active drop mechanism, however if the threshold limit is exceeded the active drop mechanism will have received a third indicator of an incast event occurring.

Upon receiving the three indicators, the active drop mechanism is activated and acts to identify a data packet or data packets which could be actively dropped. The data packets within the Ethernet network are assigned one of eight levels of priority. The priority value is part of the IEEE 802.1Q standard. The active drop mechanism uses the priority level assigned to each data packet to decide if that data packet could be actively dropped.

The active drop of a data packet is initiated when all the conditions indicate a drop is required to prevent buffer overflow and to persuade the TCP transmitter to initiate resending of packets. This is done by dropping one packet for a particular TCP flow and then letting a small number of packets from the same TCP flow through. This should cause the TCP receiver to generate duplicate acknowledgments and this in turn should cause the TCP transmitter to resend the dropped packets.

There are many different implementations of TCP and individual implementations might behave differently depending on control settings and the value of the initial RTT detected when the TCP stream was opened. In this example, the TCP is implemented such that if only one packet is missed from the natural expected packet sequence that arrives at the receiver then there could be a small reordering of the packets in the network and a retry request will not be issued. The more packets that are received without the missing packet the more likely it is that the packet has been lost and the transmitter must be requested to resend the missing packet. The TCP receiver is forced to generate duplicate acknowledgments and the TCP transmitter is therefore fooled into assuming a network error has occurred and persuaded to resend the dropped packets without waiting for a timeout period.

The mechanism then drops all packets of the particular TCP flow until the conditions of the incast are seen to go away. As already stated the FC mechanism measures the amount of outstanding data buffered in the network. Once the active drop has started the only data buffered in the network will be for those packets that have already been allowed past the active drop mechanism. The TCP process on the receiver will only generate duplicate acknowledgments when the final packets are received that were allowed past the active drop mechanism after the single packet was dropped. When this final packet is transmitted onto the external Ethernet network the FC measured internal outstanding data value will become zero.

Figure 5:
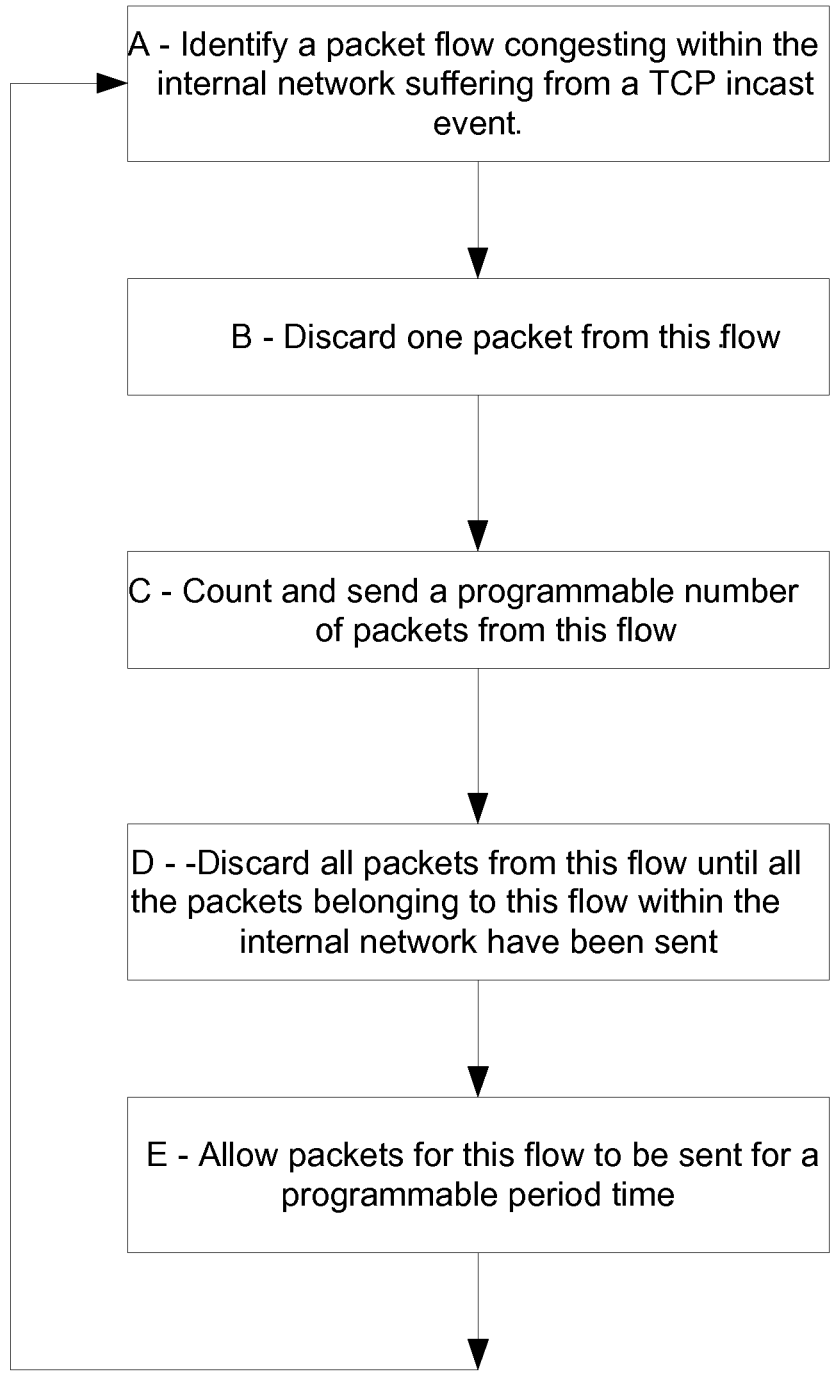
FIG. 5 is a flow diagram illustrating a method embodying one aspect of the present invention.

Such a method is illustrated in more detail in FIG. 5. In such a method, a congesting packet flow is identified (step A), and one data packet is discarded from this flow (step B). A programmable number of data packets are then sent from the identified flow (step C). Any remaining data packets from this flow are then discarded until the flow contains no data packets that are yet to be sent (step D). Following the clearance of the identified flow, data packets for the identified flow are then sent for a programmable time period (step E).

Typically, network systems are more complicated than that shown in FIGS. 3 and 4. For example, it is common for there to be many different TCP flows using a link. Although everything sent on the egress port experiencing an incast will be badly affected by the incast event, unrelated packets being received on any of the ingress ports receiving frames to be sent to the egress incast port should not be affected provided the packets being sent to the incast affected port are being deleted. The congestion occurs as the packets leave the network not as they enter the network. For this reason, a network system having multiple TCP flows using a single link entering the network will have a small associative TCPHash value cache provided within the network to manage the TCP flows involved in incast events. In this case, a cache having 16 entries is a sufficient size. However, it will be clearly understood that a cache having 32 entries or more may be used.

Figures 6, 7:
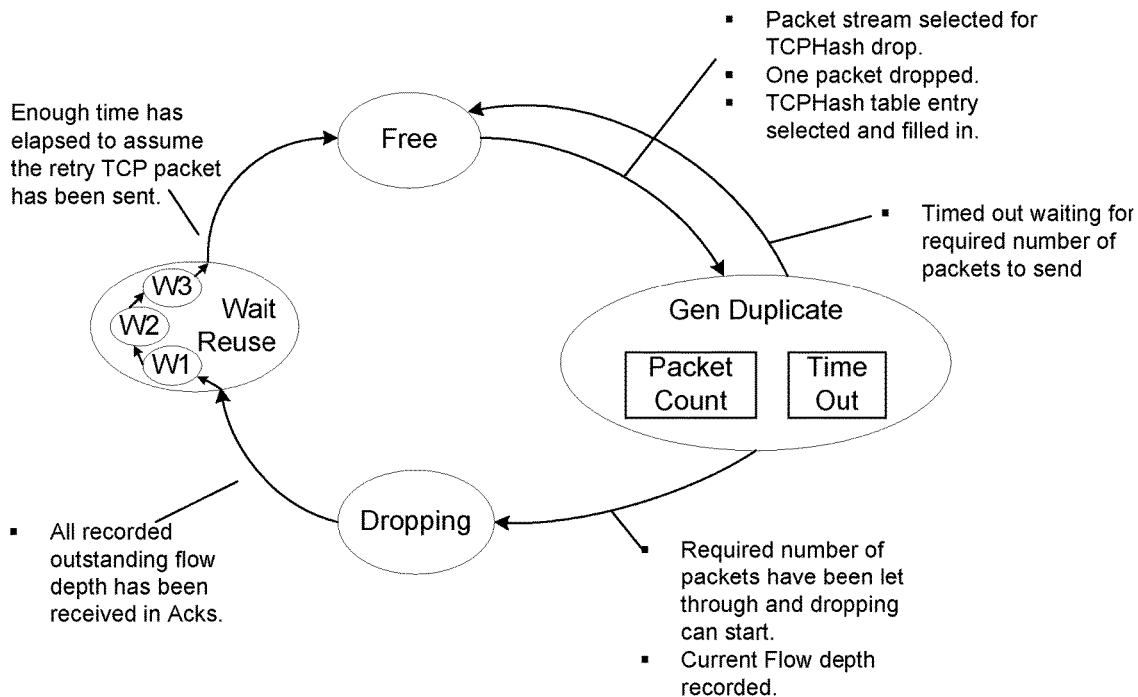
FIG. 6 is a block diagram of a TCP Hash Cache according to the present invention.
FIG. 7 is a diagrammatic representation of the State transitions of the TCP Hash Cache depending on the stage of the active drop mechanism of the present invention.

The implementation of the TCPHash cache in this embodiment sees a cache wherein each cache entry has four fields which, as is shown in FIG. 6, represent 16 bit TCPHash Value; 6 bit FC#, 8 bit Outstanding Flow and 5 bit State respectively although this is only an example and other widths to these fields is equally valid.

TCP Hash Values calculated from the IP headers of TCP data flows will be input into the 16 bit TCPHash Value fields of the cache.

The network has a mechanism called Flow Channels (FC) that follow the flow of all Ethernet data packet streams through the internal network from source to destination. FC# will be input into the 6 bit FC# field of the cache.

The FCs are able to directly measure the data still within the network using an Outstanding Flow value. The Outstanding Flow value is the amount of data which has been received by the network minus the amount of data which has been transmitted out of the network. The Outstanding Flow value thus increases when data packets enter the network at an ingress port and is decreased by acknowledgments returned from the destination egress port as data packets leave the network. Outstanding Flow Values will be input into the 8 bit Outstanding Flow field of the cache.

The 5 bit State field of a cache entry is used to record the stage in the active drop mechanism of a TCP data flow associated with a TCPHash Value in the TCPHash Value field of the same cache entry. The stages of the active drop mechanism are encoded as five states, two of which are associated with a count value used to count the number of packets that should be let through after the single packet has been dropped at the start of the active drop sequence. The state allocated to a TCPHash value cache entry is transitory as the active drop mechanism moves through its different stages. FIG. 7 shows a diagrammatic representation of the state transition. The four individual states are:

Free This indicates the TCPHash entry is available for allocation.

Gen Duplicate. This state indicates the packets with a particular valid TCPHash value are experiencing congestion and an active packet drop has been started. This state includes a count value to allow a programmable number of packets from the external network into the internal network. It also includes a timeout bit to enable a way to return to the Free state and release the TCPHash entry if no more packets are received from the external network for this flow. The timeout bit is set by a programmable timing signal and cleared when a packet is sent. If the timeout bit is already set when the programmable timing signal is asserted the jump to the Free State is made. This would not normally be required as the dropping process is only started when many packets are waiting to enter the internal network.

Dropping. This indicates that all packets with a valid TCPHash value matching the TCPHash value of the cache entry associated with this state will be dropped.

Wait Reuse. This indicates the active drop mechanism is awaiting a timing signal and will eventually reset the cache State entry to Free. This delay is provided to give the TCP connection enough time for the receiver to process the out of order packets and generate one or more duplicate acknowledgments, return them to the transmitting TCP process and for it to resend the dropped packets before another dropping sequence could start again. It is important to ensure that the first resent packet is not dropped as this likely to cause a TCP timeout.

Figure 8:
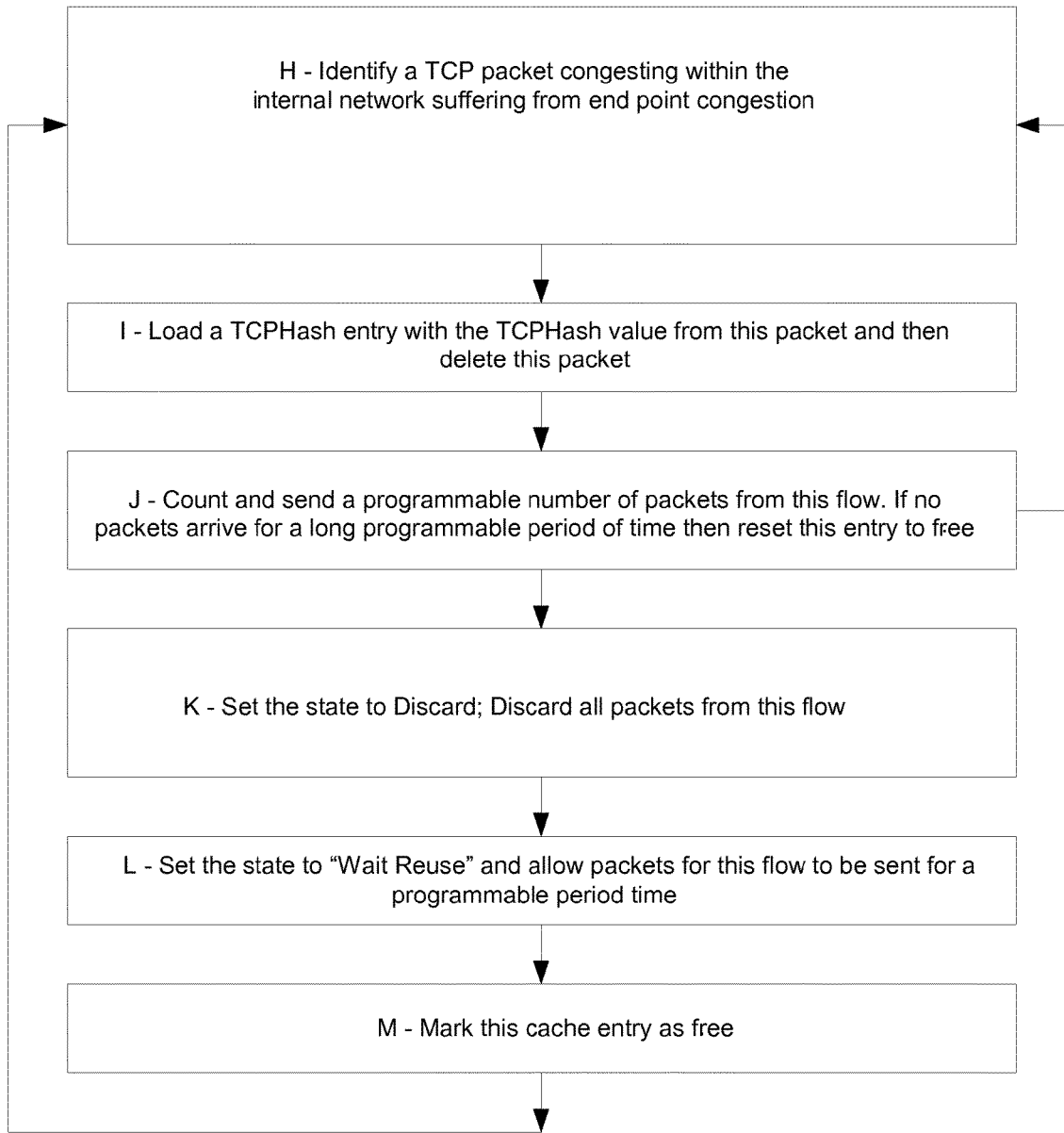
FIG. 8 is a flow diagram illustrating part of a method embodying another aspect of the present invention.

FIG. 8 illustrates steps in a method which makes use of the TCPHash entries and values. At step H, a TCP packet that is congesting within the internal network suffering from end point congestion is identified. For example, the packet should be: a valid TCP packet, suffering from internal end point congestion exceeding a configurable threshold, originating from a buffer that is in danger of overflowing, of an Ethernet priority enabled for incast active packet dropping, not already loaded as an active TCPHash cache entry, and able to load into at least one free entry in the TCPHash cache.

At step I, the TCPHash value for the identified packet is loaded into a TCPHash entry, and the packet is deleted. A programmable number of packets from the identified flow are then sent (step J). If no packets arrive for a predetermined time period, then the TCPHash entry is marked as free.

Following the sending of packets, the state is set to Discard, and the packets from the identified flow are discarded. A packet is discarded if it matches the TCPHash value, and this comparison is made when the packet is taken from, or supplied to, the packet buffer (step K). Once all the packets that have not been actively deleted that were injected into the internal network have been delivered from the internal network to the external network at the internal network egress port, then the state is set to Wait Reuse, and packets from the identified flow are able to be sent for a programmable time period (step L). When the time period expires, the cache entry is marked as free (step M).

When all the conditions to identify an incast packet stream have been met against a new packet arriving from the external network the logic looks for a free entry to perform an allocation and upon finding a free entry, the 16 bit TCPHash Value field is loaded with the TCPHash value calculated from the IP header relating to the TCP data flow logic has establish is becoming involved in an incast event There is logic to detect the conditions of an incast event and the TCPHash associative cache then manages the process of first dropping one packet, allowing a few through and then continually dropping all packets for this flow until all the congestion in the internal network has gone. The TCPHash value of each subsequent data packet entering the network is compared against all the entries of the TCPHash Cache Hash Value field entries to establish if there is a match. If a match is made then the State field status determines which stage the active drop mechanism is at and thus determines the action applied to the packet.

If the active drop mechanism has just been activated, the stage represented in the cache entry by The Gen Duplicate state are used to count out a number of data packets after one packet had been dropped when moving from Free to Gen Duplicate. A programmable number of packets are allowed through—the number depending on the TCP stack being used on the hosts connected to the external Ethernet network. The number should be large enough to fool the TCP process into resending packets. Typically this will be two or three packets depending on the version of TCP being used and the size of the initial RTT. The TCP process will see that a packet is missing (because one was dropped when the TCPHash entry was loaded) and then it needs to receive enough following packets so as to cause the transmitter to resend packets. If the packets were reordered then the missing (dropped) packet would arrive soon after the gap in the packet stream. The actual number of packets sent by the transmitting TCP process cannot be controlled so it is possible for the drop sequence to start but unable to complete because enough follow on packets to get to the dropping state are never sent. In reality this is unlikely because one of the conditions needed to initiate a drop sequence is to have a buffer nearly overflowing with packets waiting to enter the internal network. It may still happen though because not all the packets stored in the buffer are guaranteed to be for this data flow. The number being counted is controlled by a configuration register. The Gen Duplicate will start to timeout when a configurable timeout pulse occurs because the transmitter did not send another packet before the timeout duration expired. If another packet is sent the timeout bit will be reset. If another configurable timeout pulse occurs before the next packet arrives then the state is put back to Free releasing the TCPHash entry for another stream. Having a timeout bit guarantees that at least two timeout pulses have been generated without any packets being received from the transmitting TCP process. Only one timeout pulse is generated for all the entries of the TCPHash cache. If only one pulse was counted then the actual timeout of an individual TCPHash entry could be very short if it happened to be loaded just before the timeout pulse was generated. Requiring a minimum of two pulses ensures that at lease one whole timeout period is guaranteed before the state is returned to free when no packets arrive.

The state will transition from Gen Duplicate to Dropping when the required number of packets has been counted into the internal network. While the cache entry is in the Dropping state all packets arriving with a valid matching TCPHash value will be dropped, this includes all packets taken from a packet buffer with a valid matching TCPHash value. All new data packets arriving from the Ethernet MAC are also checked against the TCPHash and if they match an entry in the Dropping state they will also be dropped before they can be put into a packet buffer.

The internal network Acknowledgements returned from the destination egress port used to adjust the flow channel flow values are tested against the FC# field and the Outstanding Flow value is adjusted if necessary. These internal acknowledgments are proprietary and only appear as part of the internal network line protocol. They are very small line token values and can be sent at any time either between normal data packets or in the middle of other unrelated data packets. The Outstanding Flow values of more than one TCPHash cache entry can change if they have the same FC# field value but with different TCPHash values.

The state of a TCPHash line entry moves from "Dropping" to "Wait reuse" when all of the network data relating to this flow has drained from the internal network. The amount of outstanding network data is signaled by the internal network acknowledgment tokens. An internal network acknowledgment token is generated each time the head of a packet reaches the final egress port taking the packet from the internal network into the external Ethernet network. The control of the state machine is managed with the 6 bit flow channel number field and the 8 bit outstanding flow value and is described in detail below.

In this example the Wait Reuse state has three internal states used to count a programmable pulse delay. This state represents a stage of the active drop mechanism provided to prevent a TCP data flow from immediately entering another active TCPHash drop sequence while there is a possibility of the retransmitted TCP frame arriving. When the allotted time has expired the TCPHash cache entry is set into the "Free" state and can be reallocated to another TCP stream. The Wait Reuse period should be set large enough to allow the receiving TCP process to generate the duplicate acknowledgments, return them to the transmitting TCP process and for the transmitting TCP process to resend the dropped packets. This will prevent a TCP timeout caused by the whole active drop sequence restarting again on the same TCP stream before the resent packet has had a chance to enter the internal network.

The 6 bit Flow channel number (FC #) field and 8 bit Outstanding Flow value field of the cache are loaded with the FC# and Outstanding Flow value respectively each time a data packet is allowed through the network in the Gen Duplicate state. The FC # is loaded with the allocated flow channel and the Outstanding Flow is loaded with the current value taken from the flow channel when a packet is injected into the network. Then, each time an Acknowledgement is received from the network, the flow channel of the acknowledgement is matched against all the TCPHash cache entries FC # fields and all entries that are in the Dropping state will decrement their Flow difference values by the delta received with the Acknowledgement. If the result of the decrement causes the flow difference to become zero or change from positive to negative then the state will be moved from dropping to Wait Reuse. This transition occurs when all the end point congested packets, which had been waiting in the network, have been delivered to the destination. This is the first opportunity for the host, experiencing the incast, to issue a retry request and it marks the point in time when discarding additional packets runs the risk of discarding the retried packets. In the mean time all the network congesting packets will have been removed from the buffers. This method removes the need to monitor the TCP flow in the opposing direction.

This mechanism, when correctly configured will significantly reduce the probability of a TCP timeout and the corresponding catastrophic loss of bandwidth. Instead the TCP transmitter will resend packets without delay after receiving the returned duplicate acknowledgments. The TCP resent packets will also reduce performance by requiring additional data packets to be sent into the network however, the impact through loss of bandwidth will probably be at least two orders of magnitude less than a TCP timeout in a data center environment.

The mechanism does not require any deep packet inspection and does not require the any inspection of the TCP flow in the opposite direction that might not even be using the same ports. It does not require any changes to the standard TCP protocol. The method can be applied to single switching elements or a better performing version can be applied to a whole network of switching elements.

This mechanism will not be invoked with unrelated internal network congestion. Multicast/broadcast operations are not included in active drop operations.

Various modifications may be made to the embodiments hereinbefore described without departing from the scope of the invention. For example, there are many ways to compress values but a cyclic redundancy check (CRC) can give very good results, however any suitable compression technique can be used. The 16 bit hash value allows many different flows to be identified without needing too much logic to store and compare values. However, it will be appreciated that hash values having other numbers of bits would also be suitable. The method does not rely on compression and will work with no compression at all as long as a stored representation of the TCP stream is made.

In a multi-stage network, detection of end point congestion can be done on any of the switching elements used within the network. If they have the same network route value as the packet being transmitted then there is true end point congestion. If the network is able to manage individual data flows then the tables associated with these flows could use the same translated values to identify each flow. Each entry of these tables needs to match against the destination and the source of the flow. If the tables are associatively accessed then it is a simple extension to allow them to additionally detect other matches against the destination without a match against the source.

The invention claimed is:

1. A method of controlling data packet congestion in a data packet network by reducing transmission control protocol (TCP) timeouts using a TCPHash cache, the method comprising the steps of:
    determining a reference flow condition that results in data packet congestion at a node of the data packet network;
    identifying a data packet flow having a flow condition substantially equal to the reference flow condition which is thus also calculated to result in data packet congestion at the node of the data packet network, and for such an identified data packet flow:
    identifying a data packet in the identified data packet flow that is suffering from congestion, determining a TCP Hash value for the identified packet and loading the TCP Hash value into an entry within the TCPHash cache, wherein the TCP Hash value is calculated from an IP address for the identified data packet;
    causing the identified data packet to be dropped from the identified data packet flow and modifying a state value of the entry within the TCPHash cache to indicate that an active drop process has started;
    subsequently allowing a predetermined number of data packets from the identified data packet flow to proceed;
    stopping the transmission of data packets from the identified data packet flow subsequent to the predetermined number of data packets and adjusting the state value to indicate that data packets in the identified data packet flow will continue to be dropped until the predetermined number of packets have been delivered to an egress ports of the data packet network and an acknowledgement of the delivery is received; and
    in response to the acknowledgement of delivery, initiating a retransmission of the dropped data packet and subsequent data packets in the flow condition, and adjusting the state value to a normal setting indicating that active dropping is no longer occurring.

2. The method of claim 1, wherein the reference flow condition relates to destination information of a data packet flow, and the flow condition relates to destination information of the identified data packet flow.

3. The method of claim 1, wherein identifying a data packet flow includes identifying source and destination information for the data packet flow concerned.

4. The method of claim 1, wherein identification of a data packet flow is performed upon entry of the data packet flow concerned into the network.

5. The method of claim 1, wherein identification of a data packet flow is performed while a data packet flow is waiting at a network switch of the network.

6. The method of claim 1, wherein the identified data packet flow is an incast flow.

7. The method of claim 1, further comprising determining a data quantity threshold value for the network, and identifying a data packet flow that causes that threshold value to be exceeded, such that the data packet flow becomes the identified data packet flow.

8. The method of claim 1, further comprising allocating a priority value to an incoming data packet flow, and using that priority value when identifying the data packet flow.

9. A data packet flow controller for controlling data packet congestion in a data packet network by reducing transmission control protocol (TCP) timeouts, the controller maintaining a TCPHash cache to coordinate operation, the controller configured to provide:
    a flow channel mechanism operable to determine a reference flow condition that results in data packet congestion at a node of the data packet network, further operable to identify a data packet flow having a flow condition substantially equal to the reference flow condition which is thus also calculated to result in data packet congestion at the node of the data packet network; and
    an active drop mechanism operable, for the identified data packet flow, to:
    identify a data packet within the identified data packet flow that is suffering from congestion and creating create an TCP Hash value for the identified data packet and loading the TCP Hash value into an entry within the TCPHash cache, wherein the TCP Hash value is calculated from an IP address for the identified data packet;
    cause the identified data packet to be dropped from the identified data packet flow and modifying a state value within the TCPHash cache to indicate that an active drop process has started;
    subsequently allow a predetermined number of data packets from the identified data packet flow to proceed;
    stop the transmission of data packets from the identified data packet flow subsequent to the predetermined number of data packets and adjusting the state value to indicate that remaining data packets in the identified packet flow will be dropped until the predetermined number of data packets have been delivered to the egress ports of the data packet network and an acknowledgement has been received which will thus create a retry; and
    as part of the retry, retransmitting the dropped data packet and the subsequent data packets and adjusting the state value to a normal setting indicating that the active drop process is no longer occurring.

10. The controller of claim 9, wherein the reference flow condition relates to destination information of the data packet flow, and the flow condition relates to destination information of the identified data packet flow.

11. The controller of claim 9, wherein the flow channel mechanism is operable to identify source and destination information for the data packet flow concerned.

12. The controller of claim 9, wherein the flow channel mechanism is operable to identify the data packet flow upon entry of the data packet flow concerned into the network.

13. The controller of claim 9, wherein the flow channel mechanism is operable to identify the data packet flow while a data packet flow is waiting at a network switch of the network.

14. The controller of claim 9, wherein the active drop mechanism is operable to determine a data quantity threshold value for the data packet network, and to identify the data packet flow that causes that threshold value to be exceeded, such that the data packet flow becomes the identified data packet flow.

15. The controller of claim 9, wherein the active drop mechanism is operable to allocate a priority value to an incoming data packet flow, and to use that priority value when identifying the data packet flow.

16. A method of controlling data packet congestion in a data packet network having a plurality of nodes by reducing the occurrence of transmission control protocol (TCP) timeouts, the method making use of a TCPHash cache and comprising the steps of:
determining a reference flow condition that results in timeouts caused by congestion at a node of the data packet network;
identifying at least one subsequent data packet flow having a flow condition substantially equal to the reference flow condition and thus calculated to also result in timeouts, and for the identified subsequent data packet flow:
identifying a data packet within the identified subsequent packet flow that is calculated to result in a timeout, determining a TCP Hash value for the identified data packet and loading the TCP Hash value into an entry within the TCPHash cache, wherein the TCP Hash value is calculated from an IP address for the identified data packet;
causing the identified data packet to be dropped from the identified data packet flow and modifying a state value of the entry within the TCPHash cache to indicate that an active drop process has started;
subsequently allowing a predetermined number of data packets from the identified subsequent data packet flow to proceed;
continuing to drop data packets from any further subsequent data packet flow having a flow condition substantially equal to the reference flow condition and adjusting the state value to indicate that the further subsequent data packets will be dropped until the predetermined number of packets have been delivered to the egress ports of the data packet network and a delivery acknowledgement has been received thus indicating that the congestion has been cleared; and
in response to the delivery acknowledgement, resending the dropped data packet and all subsequent data packets and adjusting the state value to normal thus indicating that the active dropping process is no longer occurring.

17. The method as claimed in claim 16, wherein the identified data packet flow is an incast flow.

18. The method as claimed in claim 17, wherein identifying a data packet flow includes identifying source and destination information for the data packet flow concerned.

19. The method as claimed in claim 16, wherein identification of the data packet flow is performed upon entry of the data packet flow concerned into the network.

20. The method as claimed in claim 16, wherein identification of the data packet flow is performed while the data packet flow is waiting at a data packet network switch of the network.

21. The method as claimed in claim 16, further comprising determining a data quantity threshold value for the data packet network, and identifying the data packet flow that causes that threshold value to be exceeded, such that the data packet flow becomes the identified data packet flow.

22. The method as claimed in claim 16, further comprising allocating a priority value to an incoming data packet flow, and using that priority value when identifying the data packet flow.

23. The method of claim 1 wherein the TCPHash cache has multiple entries, with each entry including the TCP Hash value, a flow channel value, an outstanding flow value and the state value, wherein the TCP Hash value is calculated from an IP header of the data flow, wherein the flow channel value is provided by flow channel mechanisms within the data packet network, and wherein the outstanding flow value is monitored by the flow channel mechanisms and is a determination of data within the data packet network.

24. The controller of claim 9 wherein the TCPHash cache has multiple entries, with each entry including the TCP Hash value, a flow channel value, an outstanding flow value and the state value, wherein the TCP Hash value is calculated from an IP header of the data flow, wherein the flow channel value is provided by flow channel mechanisms within the data packet network, and wherein the outstanding flow value is monitored by the flow channel mechanisms and is a determination of data within the data packet network.

25. The method of claim 16 wherein the TCPHash cache has multiple entries, with each entry including the TCP Hash value, a flow channel value, an outstanding flow value and the state value, wherein the TCP Hash value is calculated from an IP header of the data flow, wherein the flow channel value is provided by flow channel mechanisms within the data packet network, and wherein the outstanding flow value is monitored by the flow channel mechanisms and is a determination of data within the data packet network.

* * * * *